United States Patent Office 2,877,566
Patented Mar. 17, 1959

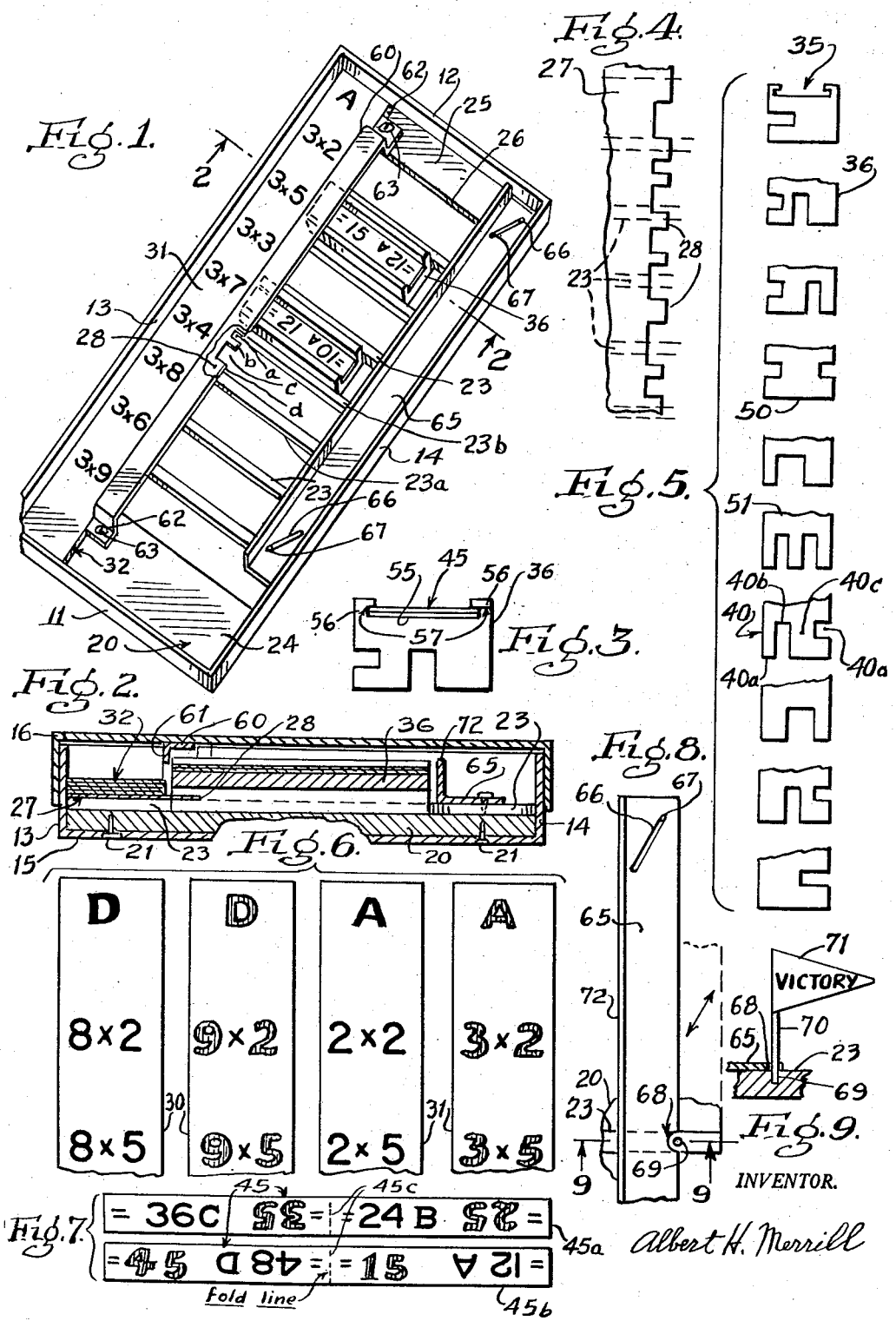

2,877,566

EDUCATIONAL TOY WITH PROBLEM SOLUTION INDICATION

Albert H. Merrill, Los Angeles, Calif.

Application February 3, 1955, Serial No. 485,913

6 Claims. (Cl. 35—9)

This invention relates to an educational toy or game provided with a problem solution indicating means.

More specifically, the present invention pertains to a problem and answer device of the kind which forms the subject matter of my patent No. 2,701,423, issued Feb. 28, 1955, and entitled "Educational Device With Interfittable Problem and Answer Members," among others the objects of this invention being to simplify the construction of the selector means carried by the answer blocks; to reduce the number of blocks required to carry all the products of elementary multiplication; to avoid the necessity of using more than a single selector plate, and to improve various other features, as will hereinafter appear.

The present invention also simplifies the construction described and claimed in my co-pending application serial No. 433,735, filed June 1, 1954.

Stated more specifically, it is an object of the invention set forth in this application to improve upon the block structures set forth in my above mentioned patent and co-pending application by providing a set of answer bearing blocks wherein simplification is achieved and cost of manufacture greatly reduced by longitudinally grooving elongated blocks in such a manner as to produce the required selective feature at both ends of the individual blocks.

By the present invention a system of block grooving is provided which enables the manufacturer to produce selector means solely by a rapidly performed grooving operation, no selector pins on the blocks being required, because intact block portions between grooves perform their function.

Other objects, advantages and features of invention will hereinafter appear.

Referring to the accompanying drawing, which illustrates a preferred embodiment of the invention, Fig. 1 is a perspective, on a smaller scale than the remaining views, showing the complete device except that the cover has been removed and only two of the answer bearing blocks are shown. In this view the problem solution indicating slide is shown retracted.

Fig. 2 is an enlarged cross section on the plane indicated by line 2—2 on Fig. 1, the cover being included and the problem solution indicating slide being shown in its advanced position.

Fig. 3 is an end elevation showing one of the answer blocks on an enlarged scale, a folded answer bearing slip being shown carried by said block.

Fig. 4 is a plan view of a fragment of the selector plate illustrating the variegated notching thereof.

Fig. 5 illustrates in end elevation the arrangement of the selector grooves of a set of ten answer blocks. In this view only the uppermost block is completely shown, the remaining blocks being fragmentarily shown in order to simplify illustration.

Fig. 6 is a fragmentary plan view illustrating both faces of two of the four problem bearing strips used in teaching elementary multiplication.

Fig. 7 is a plan view illustrating both faces of a typical foldable answer bearing slip, the mounted position of which is shown in Figs. 1, 2 and 3.

Fig. 8 is a fragmentary plan view showing the problem solution indicating slide in its advanced position wherein it uncovers the socket which receives the stem of the "Victory" emblem shown in Fig. 9.

Fig. 9 is a fragmentary section, the plane of section being indicated by line 9—9 on Fig. 8, showing the "Victory" emblem in its mounted position.

Referring in detail to the drawing, an elongated rectangular tray or lower box section comprises end walls 11 and 12 and side walls 13 and 14, these four walls upstanding from a floor or bottom 15. When the device is not in use it may have applied to it a cover 16 shown in section in Fig. 2.

As shown in Figs. 1 and 2, the aforesaid tray has fitted into it a base plate 20 desirably secured to the floor 15 by fasteners such as screws or tacks 21. The upper face of this plate (which may be made of wood), is transversely broadly grooved in such a manner as to produce across it a series of substantially parallel spaced apart ribs 23 and intact tray end portions 24 and 25 between which the grooves 26 are located.

Viewing the device as shown in Fig. 2, an elongated selector plate 27 overlies the left side portion of the upper face of said base plate resting upon the ribs 23 thereof. Said selector plate has a variously contoured lip portion 28 along its right hand edge, consisting of intact portions and intervening notches, the function of which will presently appear. This selector plate may loosely overlie the structure upon which it rests or may be attached thereto by any suitable means, not shown.

A set of four problem bearing strips is provided when the device is to be used for teaching the elementary multiplication table, Fig. 6 showing two typical strips 30 and 31 of this set, the strip 30 bearing upon one face "8" as a multiplier and upon its opposite face "9" as a multiplier, and the strip 31 likewise bearing "2" and "3" as multipliers. As shown in Fig. 1 the multiplier 3's on strip 31 form part of a column of problems extending lengthwise of the strip and are associated with the multiplied numerals "2" to "9" inclusive, the multiplied numerals not being arranged in a uniformly increasing manner but being "scrambled" so as to guard against the user of the device getting into the habit of counting up from a given product to the next higher one.

It will be seen that four problem strips of the type shown must be provided to set forth the entire elementary multiplication table beginning with two times two and ending with nine times nine, and so it is to be understood that there will be contained in the pack 32 4–5 and 6–7 multiplication strips patterned after the 2–3 strip 31 shown on a small scale in Fig. 1 and fragmentarily shown on a larger scale in Fig. 6. The purpose of showing in red certain of the characters on the problem strips, as shown in Fig. 6, will be explained later.

A set 35 (see Fig. 5), of at least eight elongated answer bearing blocks is provided to co-operate with the aforesaid problem bearing strips. These blocks are cross-sectionally dimensioned to fit slidably in the aforesaid grooves or channels 26 of the base plate 20. One or more selector grooves extends from end to end of each of said blocks, thus giving a selectively recessed character to the ends of the blocks so that only a block bearing an answer to a problem carried by a problem bearing strip can be mated with that part of the toothed lip 28 of the selector plate which is opposite to the problem answered by a number carried by the block.

The aforesaid mating feature will be understood by comparing the grooving of a sample block 40 of Fig. 5 with the contour of the part of the selector plate's lip 28 which is exposed in Fig. 1 between adjacent ribs 23a and 23b of the base plate 20. Adjacent to the rib 23b the lip 28 has a narrow notch a into which will fit the part 40a of block 40. Then, coming toward the observer, said lip has an ear b which will fit into the groove 40b of said block. Then said lip has a double width notch c into which fits the relatively wide intact part 40c of said block. Finally the lip has an ear or shoulder d adjacent to the rib 23a and this shoulder will be accommodated by the groove 40d in the block.

In Fig. 4 an end portion of the selector plate 27 is shown and the positions of the ribs 23 in relation thereto are indicated by broken lines. By comparing this view with Fig. 5 it will be seen that the uppermost block of the latter view can be mated with the part of the plate between the upper pair of ribs of Fig. 4 and that the second and third blocks are, respectively, mateable with the second and third inter-rib sections of the plate. The symmetrically grooved blocks 50 and 51 are omitted in this downward count, leaving eight blocks, which is all there is room for in aforesaid channels 26 which guide the blocks while being moved into their answer indicating positions.

Considering the blocks in their operative positions, it will be observed that most of them contain one or more grooves along their bottom faces, said faces being opposite to their answer bearing faces.

In the upper part of Fig. 7 is shown one of the faces 45a of an answer bearing slip 45, and in the lower part of this view the opposite face 45b of said slip, is shown. This slip is preferably slightly perforated at 45c at its midlength to aid in accurately folding its end portions upon each other in either direction.

Looking, for example, at block 36, shown on an enlarged scale in Fig. 3, said block is provided with a mounting means for said slip 45. After said slip has been folded upon itself with the desired answer bearing face exposed to view and directed upwardly it is mounted upon said block. For this purpose the block is provided with a broad groove 55 extending from end to end thereof along its upper face, and with an upstanding rib 56 along each side of said groove, said ribs having internal undercuts 57 properly spaced and dimensioned to have inserted in them in an endwise manner the slip 45 when folded and positioned as aforesaid, so that the mounted slip will appear as shown in the upper part of Fig. 1. The remaining seven answer bearing slips will be placed in their mounted position in a like manner.

It will be observed that certain characters shown on the problem strips in Fig. 6 and on the answer slip shown in Fig. 7 carry the red indication. This color coding is provided to guide the user of the device in placing said strips and slips in their proper operative relations to each other, as will be understood when the operation is described.

It is desirable, but not essential, that a bridge piece or guard strip 60 be provided to conceal the lip 28 of the selector plate 27 and to prevent the user of the device, when putting the elongated answer bearing blocks in place, from sliding the leading ends of the blocks up over the edge of said lip. This bridge piece is shown as an elongated strip of form retaining sheet material having a downwardly directed stiffening flange 61 extending along its length and having at each end an angular foot portion 62 apertured to receive a fastener 63 anchored to the base plate 20.

The problem solution indicator means comprises an elongated, desirably sheet metal slide 65 having through each of its end portions a slot 66, these slots being similarly inclined in relation to the length of the slide and each loosely receiving a pin 67 located near the tray wall 14 and extending into an underlying rib 23 of the base member 20, thus fastening the slide to said member for longitudinal and lateral movement as indicated by the double headed arrow on Fig. 8. That edge of the slide which is directed toward the tray wall 14 is desirably provided with a notch 68 so positioned that, when the slide is advanced to the limit of its movement in that direction, said notch uncovers a socket 69 in the underlying rib, thus making it possible to insert into said socket the lower end of the stem 70 of the "Victory" emblem which carries the pennant 71. The slide is provided with an upstanding longitudinal flange 72 which not only reinforces it, but also prevents more effectively the slide being advanced sufficiently to uncover the aforesaid socket if any of the aforesaid blocks are located between the slide and selector plate lip 28 in a mismated relation to said lip so that it prevents such blocks from being positioned out of the path of the slide.

All the side grooves of the blocks (for example the groove 40d of block 40), are sufficiently spaced above the blocks' bottoms to register with the selector plate lip 28 and where they will not diminish the side to side bottom dimension of any of the blocks, so said blocks will all properly fit slidably within the channels or broad guide grooves 26.

To prepare the device for use the manufacturer or instructor will so arrange the problem strips of the pack 32 that the exposed face of the upper strip displays the desired column of problems to be solved, the showing being as in Fig. 1, assuming "3" is to be the multiplier. Then, in regard to the answer bearing slips carried by the blocks, said answer bearing slips must be at least eight in number and are typified by the slip 45 of Fig. 7. These block-carried slips have the answers arranged upon them in such a manner that all the instructor has to do in making a change to a different pair of multiplying numerals is to see that the code letter (A, B, C or D), on the exposed answer slip face seen on each of the eight blocks is the same as the code letter seen on the uppermost problem strip of the pack 32, and that the proper endwise relation of the answer bearing slips to the blocks is maintained. When red characters appear on the uppermost strip of the pack 32, then red answer numerals are carried by the block ends which are to be mated with the selector plate, and likewise black numerals are matched with black on said strips and block ends.

In changing from "2" to "3" or from "3" to "2" as a multiplier it is only necessary to turn over the top slip of the pack 32 and then turn the blocks end for end in relation to the selector plate 27. And the same procedure is followed in changing from one to the other of the remaining paired multipliers.

It is deemed desirable to provide a somewhat larger number of blocks than eight because, otherwise, after the person using the device has put seven blocks into mated relations with the selector plate then he will know, without making any mental effort, that the eighth block belongs in the remaining open inter-rib groove; but by providing, for example, ten blocks and furnishing the extra blocks with answer bearing slips that display, desirably, prime numbers, it will be rendered necessary to use a mental effort to select the block which carries the answer to the last problem to be solved. It is deemed best to use the aforementioned symmertcially grooved blocks 50 and 51 for the aforementioned extra blocks.

To aid the manufacturer in properly arranging the answers on the answer bearing slips and then mounting the slips on the blocks in the proper manner, it is pointed out that the end of the block 36 as seen in the upper part of Fig. 5 is the end of said block which mates the second section of the selector plate in Fig. 1, and the opposite end of said block when turned toward the observer will have the contour of the next to last block end of Fig. 5, which latter block end will mate with that section of the selector plate which is opposite to the red printed problem three times six; but when the top problem strip 31 is turned over, two times six in black will be substituted and the product will be "12"

and will appear right side up on the reversed block, this product being correctly shown in inverted position in the lower part of Fig. 7. What has just been said gives the key to the method of determining the various other products and their positions on the remaining block carried slips.

If desired, instead of using the broadly grooved base member 20 to guide the movement of the blocks toward the selector plate 27, a thick cardboard base member like that shown in my co-pending application Serial No. 446,807, filed July 30, 1954, may be used and the guides for the blocks formed by cutting slots in the cardboard. Such a base member will lower cost of manufacture, but will not be of so sturdy a character.

Also other changes, not exceeding the scope of the claimed invention, may suggest themselves to the skilled workman.

I claim:

1. In an educational problem and answer device of the class described, a problem solution indicating slide having a combined longitudinal and edgewise movement and movable, when unobstructed by answer bearing members in misplaced positions laterally adjacent thereto, from a retracted unsolved problem indicating position to an advanced problem solution indicating position, and a base member upon which said slide is mounted, said base member having in it a socket to receive an erected problem solution indicating emblem, said socket being covered by said slide except when the latter is in its aforesaid advanced position.

2. The subject matter of claim 1, and said slide comprising a strip of rigid sheet material having a slot through each end portion, and an attaching pin for said slide passing loosely through each of said slots and anchored in said base member below said slide, said slots both being inclined in the same direction and at the same angle in relation to the length of said strip.

3. In a problem and answer device of the kind described, in combination, a base member forming a floor, a selector plate mounted on said member and having a lip in a superjacent parallel relation to said floor divided into differently notched selector sections associated with different problems, a bridge piece mounted upon said member in a parallel superjacent relation to said lip, thus concealing it from downwardly directed vision, and a set of answer bearing blocks having selector end portions insertable between said bridge piece and floor into engagement with said lip.

4. In a problem and answer device of the kind described, an elongated base plate having a series of substantially parallel spaced apart guides extending transversely across an upwardly directed face of said plate, an elongated selector plate overlying a portion of said face, a problem carying strip extending alongside said selector plate, said strip carrying an observable problem opposite to each of said guides, and a set of elongated blocks having upwardly directed faces bearing answers to said problems, said blocks slidably fitting said guides and having end portions abuttable against an edge of said selector plate, said blocks having downwardly directed faces most of which are grooved from end to end with one or more selector grooves, and each edge section of said selector plate over a said guide having a selector section which is differently contoured from the other selector sections, the grooving of the individual blocks varying so that only one block of the set is mateable with each of said selector plate sections with portions of the selector plate projecting into grooved portions of the block, each mated block bearing an answer to an aforesaid problem located by the section of the selector plate with which the block mates, said grooving of the blocks forming selector means at both ends of the individual blocks for mating with said selector plate sections, there being an answer to one of the aforesaid problems carried by each end portion of the upwardly directed face of each of said blocks.

5. In a problem and answer device of the kind described, an elongated base plate having a series of substantially parallel spaced apart guides extending transversely across an upwardly directed face of said plate, an elongated selector plate overlying a portion of said face, a problem carrying strip extending alongside said selector plate, said strip carrying an observable problem opposite to each of said guides, and a set of elongated blocks having upwardly directed faces bearing answers to said problems, said blocks slidably fitting said guides and having end portions abuttable against an edge of said selector plate, said blocks having downwardly directed faces most of which are grooved from end to end with one or more selector grooves, and each edge section of said selector plate over a said guide having a selector section which is differently contoured from the other selector sections, the grooving of the individual blocks varying so that only one block of the set is mateable with each of said selector plate sections with portions of the selector plate projecting into grooved portions of the block, each mated block bearing an answer to an aforesaid problem located by the section of the selector plate with which the block mates, some of said blocks when engaging said guides, having upwardly and downwardly extending side faces in which grooves are singly located in an upwardly spaced relation to the blocks' bottoms, the selector grooves which extend upwardly into their bottoms having inner portions on a level with the grooves in the sides of such blocks, said selector plate extending along a horizontal plane on a level with said grooves in the sides of the blocks, so that both said side and bottom block grooves co-operate with the selector plate.

6. In a problem and answer device, the combination, with problem presentation means and associated therewith a member having a variously contoured selector edge portion; of a set of elongated answer bearing blocks which have end portions engageable with said edge portion, said blocks being longitudinally grooved with grooves differing in width and position, thus providing between grooves intact block end portions mateable only with correspondingly contoured parts of said selector edge portion of said member, the blocks of said set being grooved from end-to-end, thereby providing the individual blocks with two selector end portions.

References Cited in the file of this patent
UNITED STATES PATENTS

| | | |
|---|---|---|
| 140,722 | Muldaur | July 8, 1873 |
| 207,124 | Kinsey | Aug. 20, 1878 |
| 1,327,775 | Platt | Jan. 30, 1920 |
| 2,645,041 | Merrill | July 14, 1953 |
| 2,701,423 | Merrill | Feb. 8, 1955 |